United States Patent
Steiner

(10) Patent No.: US 6,513,513 B1
(45) Date of Patent: Feb. 4, 2003

(54) SAW-CABLE GUIDE WITH TWO SWIVELLING CABLE GUIDE ROLLS

(76) Inventor: Andreas Steiner, Mondseeberg 77, A-5310, Tiefengraben (AT)

( * ) Notice: Subject to any disclaimer, the term of this patent is extended or adjusted under 35 U.S.C. 154(b) by 0 days.

(21) Appl. No.: 09/719,477

(22) PCT Filed: Aug. 6, 1999

(86) PCT No.: PCT/EP99/05695

§ 371 (c)(1), (2), (4) Date: Dec. 11, 2000

(87) PCT Pub. No.: WO00/09287

PCT Pub. Date: Feb. 24, 2000

(51) Int. Cl.[7] .................................................. B28D 1/06
(52) U.S. Cl. ................. 125/16.02; 125/16.01; 125/21; 125/651.1
(58) Field of Search ........................... 125/16.01, 16.02, 125/21; 83/651.1; 242/86.51, 86.52, 242.39

(56) References Cited

U.S. PATENT DOCUMENTS

| | | |
|---|---|---|
| 5,060,628 A | 10/1991 | Ishida |
| 5,303,689 A * | 4/1994 | Mayer ...................... 125/13.03 |
| 5,947,798 A * | 9/1999 | Toyama ........................ 125/21 |
| 6,352,071 B1 * | 3/2002 | Kononchuk et al. ..... 125/16.02 |

FOREIGN PATENT DOCUMENTS

| | | |
|---|---|---|
| DE | 39 40 691 A1 | 6/1991 |
| DE | 41 38 106 A1 | 5/1993 |
| DE | 93 09 277.6 | 9/1993 |
| DE | 42 20 454 A1 | 12/1993 |
| DE | 94 01 842.1 | 5/1994 |
| JP | 5-321488 | 12/1993 |
| WO | WO 95/18692 | 7/1995 |
| WO | WO 96/33058 | 10/1996 |

* cited by examiner

Primary Examiner—Joseph J. Hail, III
Assistant Examiner—Alvin J. Grant
(74) Attorney, Agent, or Firm—McGlew and Tuttle, P.C.

(57) ABSTRACT

A saw cable guide (1) is provided with a stand (2) and at least two rotatable cable guide rollers (5, 9) mounted pivotably thereon. These are arranged with their pivot axes (8, 12) forming an angle with one another. The saw cable (19) is led around the stand (2) at a corresponding angle. A rotatable deflecting roller (13) is located on the stand (2). The rotatable deflecting roller (13) guides the cable during the deflection and may have a cable guide surface (15) with an oblique profiling (21).

20 Claims, 1 Drawing Sheet

SAW-CABLE GUIDE WITH TWO SWIVELLING CABLE GUIDE ROLLS

FIELD OF THE INVENTION

The present invention pertains to a saw cable guide with a stand and at least two rotatable cable guide rollers arranged pivotably thereon.

BACKGROUND OF THE INVENTION

A saw cable guide has been known from WO96/33058. It comprises a stand with a crossbeam, which is mounted on it vertically adjustably and rotatably and at one or both ends of which a transversely extending h-shaped hollow axle is arranged. Two freely rotatable cable guide rollers are pivotably mounted at the ends of the hollow axle. The cable guide rollers are flush with their pivot axes. The saw cable is guided directly between the two cable guide rollers and led through the hollow axle. Reliable guiding of the saw cable between the two cable guide rollers is not always guaranteed in this arrangement. In addition, the forces of the cable act on is the stand kinematically unfavorably at a spaced location and with a lever arm. Moreover, the kinematics of the saw cable guide is not optimal.

SUMMARY AND OBJECTS OF THE INVENTION

The object of the present invention is to provide a better saw cable guide.

According to the invention, a saw cable guide is provided with a stand and at least two rotatable cable guide rollers arranged pivotably thereon. The cable guide rollers are arranged with their pivot axes forming an angle. A saw cable is led around the stand.

The kinematics and the support of the saw cable forces are improved according to the present invention compared with the prior art. In addition, better guiding and angle deflection of the saw cable between the pivotable cable guide rollers is guaranteed.

It is particularly advantageous here for the saw cable to be additionally guided via a rotatable deflecting roller on the stand. This shortens the free cable lengths and reduces an undesired tendency of the saw cable to vibrate. In addition, the guide surface of this deflecting roller can impart a twist to the saw cable, as a result of which a more uniform circumferential wear of the saw cable is achieved. Moreover, a smoother run of the cable is achieved due to the twist.

The pivot axes may be arranged in the same plane and at an adjustable angle of preferably 90° in relation to one another.

The deflecting roller may have an elastic cable guide surface, preferably one consisting of rubber. This cable guide surface may have oblique profiling. The roller arrangement may be arranged vertically adjustably on a stand. The cable guide rollers may have hollow pivot housings for leading through the saw cable. These pivot housings may have a locking device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
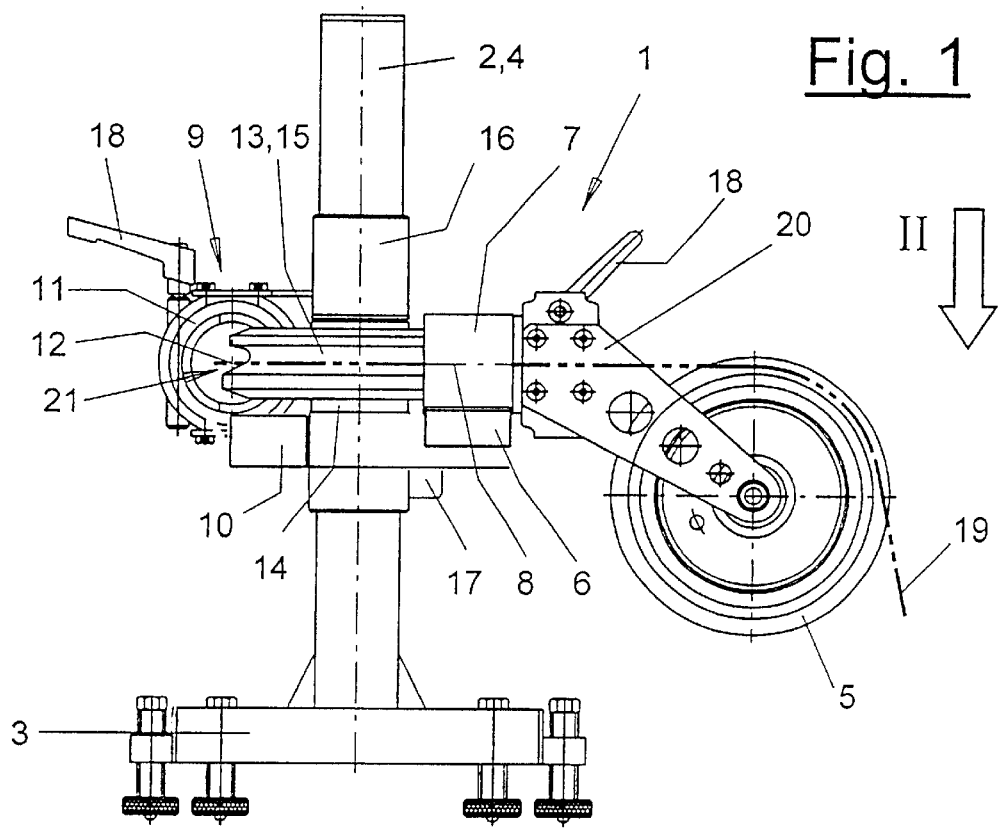
FIG. 1 is a side view of the saw cable guide according to the invention.
Figure 2:
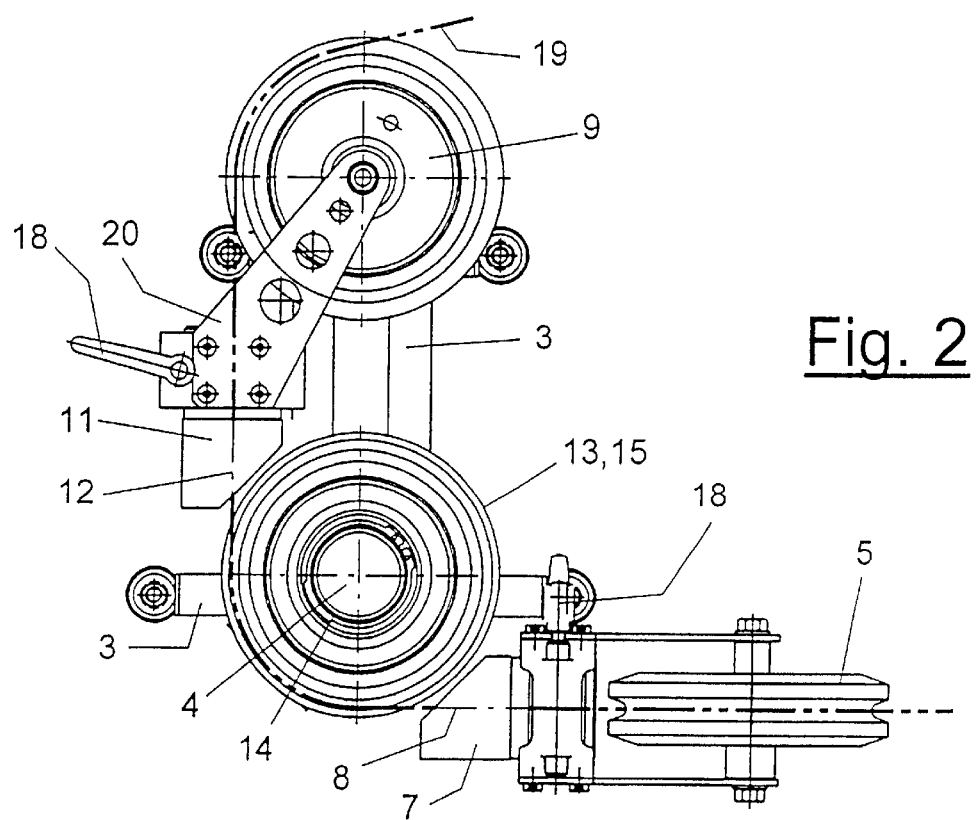
FIG. 2 is a top view of the arrangement of to FIG. 1 in the direction of arrow II of FIG. 1.

Referring to the drawings in particular, the saw cable guide 1 shown in FIGS. 1 and 2 is used in conjunction with a cable saw (not shown), which is used to cut workpieces, e.g., block-shaped bodies consisting of concrete, brickwork or other materials. Such a cable saw has been known from, e.g., WO95/18692.

The saw cable guide 1 shown is used to deflect and guide the saw cable 19 at the workpiece (not shown). It is usually present for this purpose in duplicate and may be arranged and fastened at or in the vicinity of the workpiece in a suitable manner.

The saw cable guide 1 has a stand 2, which may have any suitable design. In the embodiment shown, it has a foot plate 3 and a column 4 sticking out therefrom vertically. A plurality of leveling pins, with which the stand 2 can be aligned in the desired manner in relation to the workpiece and/or the foundation, may be present on the foot plate 3. The fixing is performed by means of a dowel screw or in any other suitable manner.

The saw cable guide 1 also has two cable guide rollers 5, 9, which are mounted on a respective pivot housing 7, 11 via an oblique extension arm 20 each. The cable guide rollers 5, 9 are mounted with their axes freely rotatably on their extension arms 20, and the extension arms 20 are in turn mounted freely rotatably by 360° on the pivot housings 7, 11. Via suitable bent brackets 6, the pivot housings 7, 11 are detachably or rigidly fastened to a common sleeve 16, which is guided slidingly vertically adjustably and lockably on the column 4. As an alternative, the pivot housings 7, 11 may also be guided vertically adjustably independently from one another on sleeves or the like of their own. The sleeve 16 with the cable guide rollers 5, 9 can be fixed at the desired height by means of a locking means 17.

The pivot housings 7, 11 permit the rotation of the cable guide rollers 5, 9 around one pivot axis 8, 12 each. These pivot axes 8, 12 are preferably arranged in a common plane and preferably in parallel to the foot plate 3. Furthermore, they are arranged at a 90° angle in relation to one another. As is shown in FIG. 2, the saw cable is led around the column 4 of the stand 2.

The brackets 6 are rigidly fastened to the sleeve 16 in the exemplary embodiment shown. As a result, the pivot axes 8, 12 form a fixed angle preferably equaling 90° with one another. As an alternative, the brackets 6 may also be mounted adjustably on the sleeve 16 with a suitable locking means, so that the pivot axes 8, 12 can also be set and fixed at another angle in relation to one another.

In the preferred embodiment, a deflecting roller 13 is mounted freely rotatably around the axis of the column on the stand 2 and especially on the column 4. The deflecting roller 13 may also be arranged with its bearing 14 on the sleeve 16. As an alternative, the deflecting roller 13 may be vertically adjustable and lockable in itself. It is preferably located with its cable guide surface 15 in the same plane as the pivot axes 8, 12, so that the saw cable 19 runs between the cable guide rollers 5, 9 via the deflecting roller 13 in the same plane and is led around the stand 2 at the desired angle.

The cable guide surface 15 consists of an elastic material, preferably rubber, and imparts a forced twist to the saw cable 19 due to lateral contact. As is illustrated in FIG. 1, the cable guide surface 15 is provided for this purpose with an oblique profiling 21, which is arranged, e.g., at the lower end of the guide surface. The forced twist reduces the circumferential wear of the saw cable 19 and makes it more uniform. In addition, the noise caused by the running of the cable is reduced. The cable guide surface 15 may be designed as a smooth surface or with grooves extending at right angles or obliquely not shown. The saw cable 19 is additionally guided by the deflecting roller 13 between the cable guide rollers 5, 9 during use, as a result of which vibrations between the workpiece and the saw cable guide 1 or the cable saw (not shown) are reduced.

Furthermore, the pivot housings 7, 11 may be designed as hollow housings, in which case the saw cable 19 is led through the pivot housings 7, 11 and is flush with the pivot axes 8, 12. The guiding through the hollow pivot housings 7, 11 is used for safety as a cable catch in the case of possible cable breaks and additionally prevents the cable from snapping backward. The oblique extension arms 20 and the distance between the rollers and the pivot housings 7, 11 are selected to be such that the saw cable 19 guided along the pivoting axes 8, 12 runs up onto the cable guide rollers 5, 9 tangentially.

Various modifications of the embodiment shown are possible. On the one hand, another type of deflecting means may be present between the cable guide rollers arranged at an angle in relation to one another instead of the deflecting roller 13. Likewise, the mounting of the cable guide rollers 5, 9 may vary as well. The deflecting roller 13 may have an additional vertical adjustment in relation to the sleeve 16 and the cable guide rollers 5, 9. An oblique position of the deflecting roller 13 is optionally also possible.

While specific embodiments of the invention have been shown and described in detail to illustrate the application of the principles of the invention, it will be understood that the invention may be embodied otherwise without departing from such principles.

What is claimed is:

1. A saw cable guide, comprising:
   a stand having a foot part and a column;
   at least two rotatable cable guide rollers arranged pivotably connected at said column, said cable guide rollers being arranged having respective pivot axes forming an angle; and
   a cable saw guide element for guided deflection around said stand from one of said two rotatable cable guide rollers to another of said two rotatable cable guide rollers.

2. A saw cable guide in accordance with claim 1, wherein said pivot axes are arranged substantially in a plane and at an adjustable angle in relation to one another.

3. A saw cable guide in accordance with claim 1, wherein said adjustable angle is about 90°.

4. A saw cable guide in accordance with claim 1, wherein said cable saw guide element is a rotatable deflecting roller arranged on said stand.

5. A saw cable guide in accordance with claim 2, wherein said cable saw guide element is a rotatable deflecting roller arranged on said stand.

6. A saw cable guide in accordance with claim 4, wherein said deflecting roller has an elastic cable guide surface.

7. A saw cable guide in accordance with claim 5, wherein said deflecting roller has an elastic cable guide surface.

8. A saw cable guide in accordance with claim 6, wherein said elastic cable guide surface includes rubber.

9. A saw cable guide in accordance with claim 4, wherein said deflecting roller has a cable guide surface with oblique profiling.

10. A saw cable guide in accordance with claim 4, wherein said deflecting roller and said two rotatable cable guide rollers form a roller arrangement, arranged vertically adjustably on said stand.

11. A saw cable guide in accordance with claim 1, wherein said cable guide rollers respectively have hollow pivot housings defining a saw cable passage.

12. A saw cable guide in accordance with claim 11, wherein said pivot housings include a locking device.

13. A saw cable guide and saw cable combination, the combination comprising:
    a stand having a foot part and a column;
    a first rotatable cable guide roller pivotably supported at said column for pivoting around a first rotatable cable guide roller pivot axis;
    second rotatable cable guide roller pivotably supported on said column for pivoting around a second rotatable cable guide roller pivot axis, said first rotatable cable guide roller pivot axis forming an angle with said second rotatable cable guide roller pivot axis;
    a cable saw guide element supported at said column; and
    a saw cable deflected around said stand by said cable saw guide element between said first rotatable cable guide roller and said second rotatable cable guide roller pivot axis.

14. A combination in accordance with claim 13, wherein said pivot axes are arranged substantially in a plane and at an adjustable angle in relation to one another, wherein said adjustable angle is adjustable from a 90° angle.

15. A combination in accordance with claim 13, wherein said cable saw guide element is a rotatable deflecting roller arranged on said stand.

16. A combination in accordance with claim 14, wherein said cable saw guide element is a rotatable deflecting roller arranged on said stand.

17. A combination in accordance with claim 15, wherein said deflecting roller and said two rotatable cable guide rollers form a roller arrangement, arranged vertically adjustably on said stand.

18. A combination in accordance with claim 13, further comprising:
    a first hollow pivot housing associated with said rotatable cable guide roller, defining a guide passage for leading through said saw cable; and
    a second hollow pivot housing associated with said rotatable cable guide roller, defining a guide passage for leading through said saw cable.

19. A combination in accordance with claim 18, wherein said pivot housings include a locking device.

20. A saw cable guide, comprising:
    a stand having a foot part and a column;
    a first rotatable cable guide roller;
    first pivot housing connecting said first rotatable cable guide roller to said column and supporting said first rotatable cable guide roller for pivoting around a first rotatable cable guide roller pivot axis;
    second rotatable cable guide roller;
    a second pivot housing connecting said second rotatable cable guide roller to said column and supporting said second rotatable cable guide roller for pivoting around a second rotatable cable guide roller pivot axis said first rotatable cable guide roller pivot axis being at an angle with respect to said second rotatable cable guide roller pivot axis; and
    a cable saw guide element providing a cable saw guide around said stand from one of said two rotatable cable guide rollers to another of said two rotatable cable guide rollers.

\* \* \* \* \*